Figure 1:
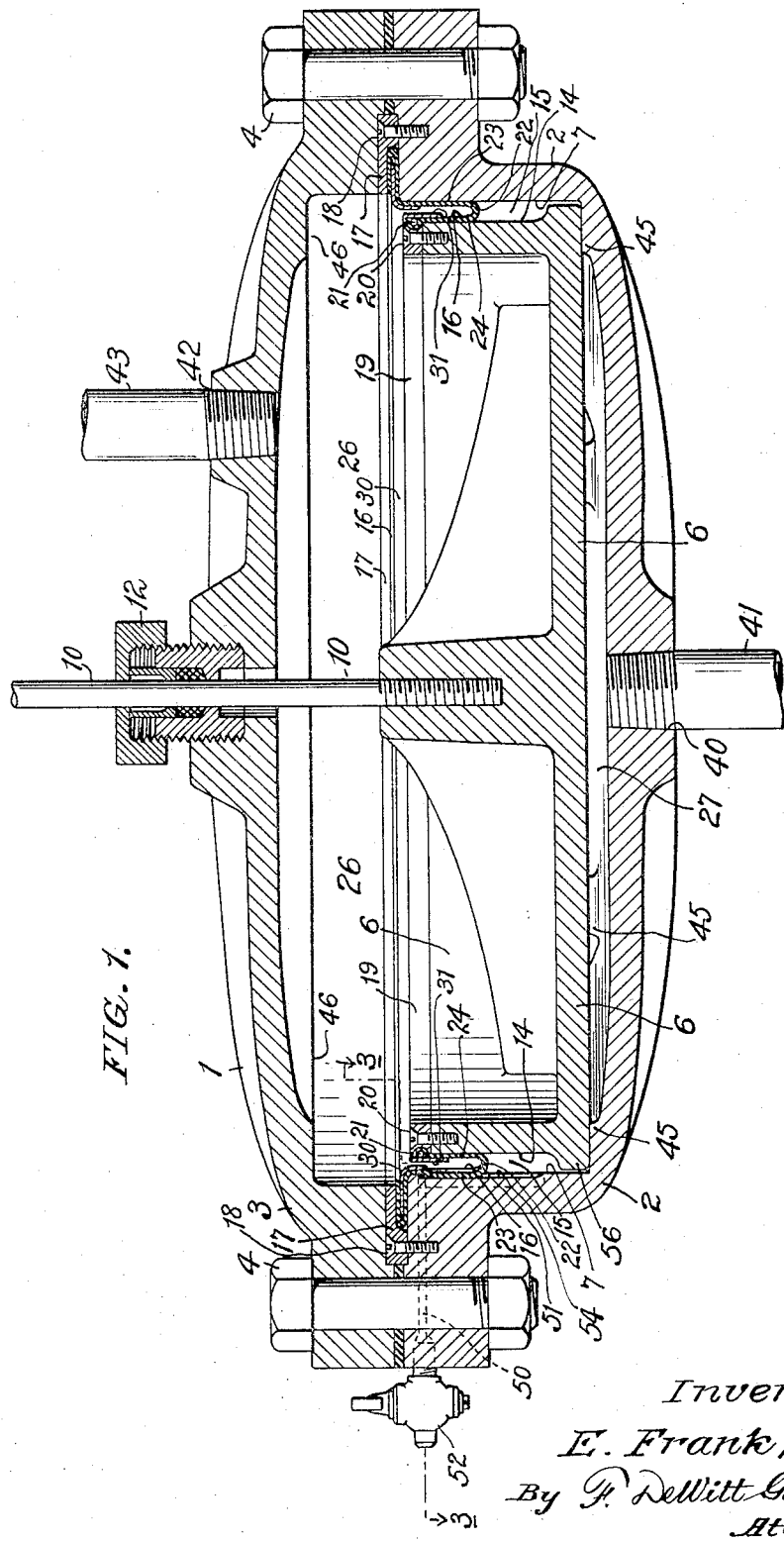

April 26, 1932.  E. F. STOVER  1,855,696
PRESSURE RESPONSIVE DEVICE
Filed April 11, 1930   2 Sheets-Sheet 1

Inventor:
E. Frank Stover
By F. DeWitt Goodwin
Attorney

April 26, 1932.  E. F. STOVER  1,855,696
PRESSURE RESPONSIVE DEVICE
Filed April 11, 1930  2 Sheets-Sheet 2
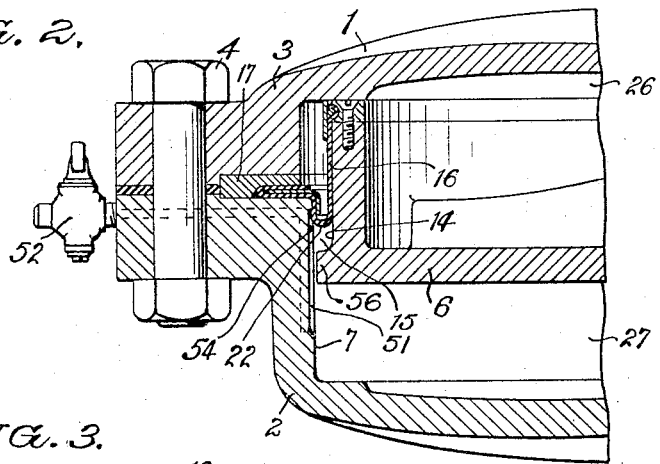
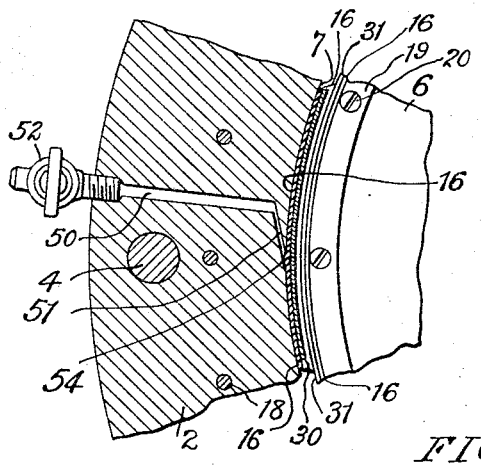
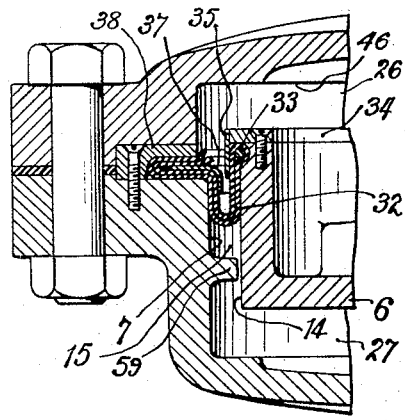
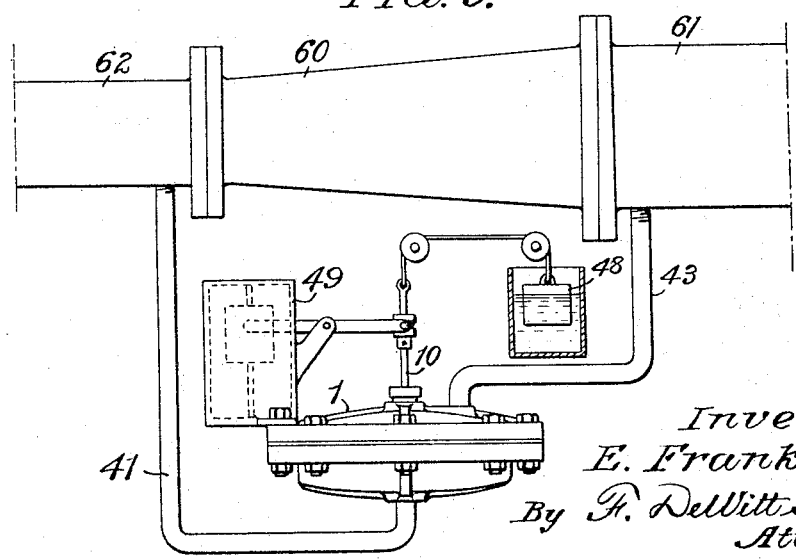
Inventor:
E. Frank Stover
By F. DeWitt Goodwin
Attorney Patented Apr. 26, 1932

1,855,696

UNITED STATES PATENT OFFICE

EMORY FRANK STOVER, OF PHILADELPHIA, PENNSYLVANIA

PRESSURE RESPONSIVE DEVICE

Application filed April 11, 1930. Serial No. 443,332.

My invention relates to a pressure responsive device adapted for use in connection with metering devices such as Venturi tubes, Pitot tubes, and orifices through which fluid is flowing, and it is desired to obtain the rate at which fluid is flowing through the metering device; or for use as an actuating device for rate controllers, valves, or any mechanism where the force applied must be directly proportional to the differential pressure applied to the pressure responsive device. My pressure responsive device may be connected with opposite sides of a metering device whereby it will be actuated by differential pressures on the opposite sides of the metering device.

The object of my invention is to provide a pressure responsive device having a constant effective piston area exposed to the differential pressures, which area is constant, at all times, regardless of the position, or the movements, of the piston whereby the force acting upon the piston and piston rod varies directly with the differential pressure on the piston; a further object is to provide a device in which the friction between the movable parts is reduced to a minimum; a further object is to provide a device comprising a cylinder, a piston freely mounted within the cylinder, and a novel form of flexible sealing member, comprising folded cylindrical portions for connecting the piston with the cylinder, said sealing member separating two chambers formed within the casing and located at opposite sides of the piston; a further object is to arrange the flexible sealing member within the annular space formed between the cylinder and the piston, with the folded portions of the sealing member resting upon the cylindrical walls of the casing and the piston whereby, only a small area of the sealing member is exposed to the pressures acting upon the piston; said sealing member being adapted to roll between the piston and the cylinder when the piston is moved, thus eliminating any variation in the size or diameter of the sealing member, when the piston is in different positions, by which arrangement there is no variation in the effective area of the piston due to the force acting upon the latter; a further object is to provide a flexible sealing member of U-shaped cross section having its edges secured to the cylinder and to the piston, respectively; a further object is to provide suitable means for holding the flexible member in cylindrical formation against the cylindrical walls of the cylinder and the piston; a still further object is to provide a construction between the piston and the cylinder which forms a safety device for preventing the destruction of the flexible sealing member in case of excessive differential pressure being applied to the piston; and still a further object is to provide a novel form of vent aperture within the casing arranged so that it will not retard the free movement of the sealing member.

These together with various other novel features of construction and arrangements of the parts, which will be more fully hereinafter described and claimed constitute my invention.

Referring to the accompanying drawings, Fig. 1 is a vertical central sectional view of my improved pressure responsive device; Fig. 2 is a partial view similar to Fig. 1 showing the piston and sealing member in a different position; Fig. 3 is a horizontal section of a portion of the device, as on line 3—3, Fig. 1; Fig. 4 is a partial vertical sectional view showing a modified form of sealing member and means for securing it upon the piston and the cylinder, and Fig. 5 is a diagrammatic view showing my device operatively associated with a Venturi tube.

Referring to the drawings, in which like reference characters refer to like parts, 1 represents a casing comprising a body portion 2 and a cover 3, adapted to be secured together by bolts 4. A piston 6 is loosely mounted within the cylindrical wall 7 of the casing, and is provided with a piston rod 10, which extends outwardly through the cover 3, which latter is provided with a stuffing box 12 surrounding the rod 10, which box may be of any well known type.

The piston 6 is provided with an annular cylindrical outer wall or surface 14 which is of smaller diameter than the inner cylindrical wall 7 of the casing, thus forming an annular space 15, which is occupied by a sealing member 16 formed of flexible material, such as rubber. One edge of the sealing member 16, as shown in Figs. 1 to 3, is secured upon the casing by a clamp ring 17, which in turn is secured upon the body portion 2 by screws 18. The inner edge of the sealing member is mounted upon a plate 19, which is detachably secured to the piston 6 by screws 20. The plate 19 is provided with an annular groove in which the sealing member is clamped by a wire ring 21.

The sealing member 16 has sufficient width, in cross section, to permit it to be folded upon itself, forming a U-shaped curved portion 22 and the folded portions 23 and 24, which portions 23 and 24 are supported upon the cylindrical wall 7 of the casing and the cylindrical wall 14 of the piston, so that only the small curved U-shaped portion 22 will be exposed to the differential pressures which are admitted to the pressure chambers 26 and 27, and particularly to the pressure in the chamber 26 above the piston. It will be seen that the exposed surfaces of the curved portion 22 of the sealing member will remain constant as the piston moves within the casing, thus the effective area of the piston will not change but will remain constant in all positions.

The folded members 23 and 24 of the sealing member are held adjacent to the walls 7 and 14 of the casing and the piston, by means of annular metal collars 30 and 31. The collar 30 is secured to the casing by the clamp ring 17 and the collar 31 is secured around the edge of the plate 19.

Said collars 30 and 31 are extended over the sealing member 16 adjacent to the portions of the latter which are secured to the casing and to the piston and are provided for directing the portions 23 and 24 of the sealing member in parallel relation with the cylindrical walls 7 and 14 of the cylinder and the piston, respectively.

Fig. 4 illustrates a modified form of sealing member 32 consisting of two thicknesses of material folded around a wire ring 33 and secured upon the piston by a plate 34 having a collar 35 depending therefrom for directing the sealing member in parallel relation with the cylindrical surface of the piston. The sealing member 32 is folded into U-shaped formation and the edges of the two layers of material embrace a collar 37 and are secured to the casing by a clamp ring 38. The collar is of L-shape cross-section and is provided for holding the sealing member against the cylindrical wall 7 of the casing. The double thick material of the sealing member 32 will be more flexible and therefore bend with less friction or resistance than if formed of a single layer equal in thickness to the two thin layers. When the device is used in connection with high pressures the double thick sealing member is of advantage, as its strength is increased without reducing its flexibility.

The body portion 2 of the casing 1 is provided with a threaded aperture 40 for the connection of a pipe 41, communicating with the low pressure chamber 27 within the casing. The cover 3 is provided with a threaded aperture 42 for the connection of a pipe 43 leading from a source of high pressure which is admitted to the high pressure chamber 26 of the casing above the piston.

The piston 6, is shown in Fig. 1, resting upon lugs 45 formed within the body portion 2. When in operation the piston is normally supported by the piston rod 10, in a position, as shown in Fig. 4, between said lugs 45 and the surface 46 upon the inner side of the cover 3. Fig. 5 shows the rod 10 attached to a counter balance 48 and also to the operating mechanism of an indicating device 49. Said rod 10 may be utilized for operating any form of valve, or device which is to be actuated by the piston 6.

The body portion 2 is provided with an air vent, shown in Figs. 1 to 3, in the form of a round aperture 50, and a vertical slot 51 formed in the cylindrical wall 7 of the body portion, which slot extends parallel with the axis of the latter. Said slot 51 is positioned tangentially, relatively to the cylindrical wall 7, as shown in Fig. 3. The tangential slot 51 communicates with the aperture 50 controlled by a valve 52 which may be opened for venting the chamber 27.

By arranging the slot 51 tangentially, the sealing member 16 will be supported by the portion 54 of the wall 7 and thus prevented from being distended as greatly as it would if the slot were positioned radially. If the flexible material, of which the sealing member 16 is formed, were forced into a radial hole, or a radial slot, far enough to stretch said material, it would become injured and defective, and it would also require some force to withdraw it. By forming the slot 51 tangentially the sealing member 16 will be supported by the wall 54 and the tendency of the material of the sealing member to enter the slot 51 will be reduced, thus insuring a free rolling movement of the sealing member from the wall 7 when the piston is moved upwardly.

The annular flange 56 upon the piston 6, as shown in Figs. 1 and 2, forms a safety guard for supporting the sealing member 16 in case the pressure in the chamber 26 greatly exceeds the pressure in the chamber 27, causing the material of the sealing member to stretch until it rests upon said flange 56, upon which it will be supported, as the opening or clearance between the outer surface of the flange 56 and the wall 7 of the casing is very small. A supporting flange 59, as illustrated in Fig. 4, may be located upon the inner surface of the wall of the casing, instead of on the piston, and will support the seating member in a like manner, when the pressure in the chamber 26 is greatly increased.

The pipes 41 and 43 are connected with opposite sides of a metering device or any suitable device for measuring the rate of flow of liquids. Fig. 5 illustrates my improved pressure responsive device connected with a Venturi tube 60 through which the flow of fluid is from the high pressure supply pipe 61 to the discharge pipe 62, in which the pressure is relatively lower than in the supply pipe 61. Any change in the rate of flow through the Venturi tube will cause a relative change of pressure in the chambers 26 and 27 in the casing 1, and the differential pressures will act upon the piston 6 and the piston rod 10. My improved construction of the sealing member 16 will always present the same effective area in all positions of the piston, therefore the force on the piston rod will vary directly with the differential pressures upon the piston, permitting extremely accurate readings to be obtained from the recording or indicating instrument. Or when used as an actuating device for moving a valve, or other mechanism, my device applies a force which is exactly proportional to the differential pressure upon the piston.

The operation of my device is as follows: The difference in pressures on opposite sides of the meter, or flow device 60, will be admitted to the chambers within the casing 1 of my pressure responsive device and the differential pressure will move the piston as the pressures in the chambers vary. During the movements of the piston the sealing member will maintain a uniform radial position by rolling upon the cylindrical surfaces of the casing and piston so that the same area, or diameter, is exposed to the different pressures on opposite sides of the piston, thus insuring a constant effective area of the piston, which does not vary with the axial movements of the piston. The force acting on the piston is communicated through the piston rod, which is connected with a recording instrument or any device, which will be operated by the action of the piston rod connected directly with the piston, which force varies directly with the differential pressure upon the piston, thus providing a device by which extremely accurate results may be obtained, as throughout the different positions of the piston there is no variation in the effective area of the sealing member due to the motion of the piston.

The advantages of my improved form of sealing member are, that it has less friction than that created by a piston slidably mounted in a cylinder, and a better seal can be formed between the chambers at opposite sides of the piston than can be obtained with a sliding piston. With my device a perfect seal is obtained between the movable member and the casing for separating the chambers. My improved sealing member has advantages over the flat diaphragms heretofore used, as it is not limited in the extent of its motion. Where a flat or corrugated diaphragm is used the movements of the diaphragm causes changes in the effective diameter of the diaphragm, whereas my improved sealing member will not cause any change in the effective diameter of the piston.

I claim:—

1. A pressure responsive device comprising a casing, an inner cylindrical wall formed upon the casing, a piston having a cylindrical surface located in spaced relation with said cylindrical wall of the casing, a sealing member having one edge secured upon the casing and its opposite edge secured upon the piston, said sealing member having folded portions supported upon the cylindrical wall of the casing and the cylindrical surface of the piston, said cylindrical wall of the casing having a slot formed therein positioned tangentially relatively to said last mentioned wall whereby the wall adjacent to the entrance of said slot will support the portion of the sealing member adjacent to said slot for limiting the distance said member will enter said slot, and said casing having a vent aperture formed through the same forming a communication between said tangential slot and the outside of the casing.

2. A pressure responsive device comprising a casing having an inner cylindrical surface, a piston movably mounted in the casing having an outer cylindrical surface located in spaced relation with the cylindrical surface of the casing, a sealing member of flexible material folded upon itself and positioned in the space formed between said cylindrical surfaces, said sealing member having its opposite ends secured upon the casing and upon the piston, said sealing member having sufficient length between the point of attachment with the casing and the piston to provide portions which are supported against the cylindrical surfaces of the casing and the piston, and an annular flange formed upon the inner cylindrical surface of the casing located in closely spaced relation with the cylindrical surface of the piston adjacent to the normal position of the sealing member for supporting the latter against distortion beyond its limit of extension due to unusual differential pressures in the casing.

In testimony whereof I affix my signature.

E. FRANK STOVER.